United States Patent [19]

Shinkawa et al.

[11] Patent Number: 4,799,162

[45] Date of Patent: Jan. 17, 1989

[54] ROUTE BUS SERVICE CONTROLLING SYSTEM

[75] Inventors: Kiyoshi Shinkawa; Takeshi Kawahara; Hideki Hayakawa; Masaru Mori, all of Hyogo, Japan

[73] Assignee: Mitsubishi Denki Kabushiki Kaisha, Tokyo, Japan

[21] Appl. No.: 923,093

[22] Filed: Oct. 24, 1986

[30] Foreign Application Priority Data

| | | | |
|---|---|---|---|
| Oct. 25, 1985 | [JP] | Japan | 60-239056 |
| Oct. 25, 1985 | [JP] | Japan | 60-239058 |
| Oct. 29, 1985 | [JP] | Japan | 60-244544 |
| Oct. 29, 1985 | [JP] | Japan | 60-244545 |
| Nov. 6, 1985 | [JP] | Japan | 60-249611 |
| Mar. 18, 1986 | [JP] | Japan | 61-62054 |

[51] Int. Cl.$^4$ ........................ G06F 15/48; G08G 1/01

[52] U.S. Cl. .................................... 364/436; 340/994; 340/910

[58] Field of Search ................ 364/436, 424; 340/916, 340/917, 994; 343/457

[56] References Cited

U.S. PATENT DOCUMENTS

| | | | |
|---|---|---|---|
| 3,568,161 | 3/1971 | Knickel | 340/993 |
| 3,662,267 | 5/1975 | Reed | 340/993 |
| 3,886,515 | 5/1975 | Cottin et al. | 340/994 |
| 3,919,686 | 11/1975 | Nabaits-Jaureguy et al. | 340/993 |
| 4,092,718 | 5/1978 | Wendt | 364/436 |
| 4,122,523 | 10/1978 | Morse et al. | 364/436 |
| 4,212,069 | 7/1980 | Baumann | 364/467 |
| 4,220,946 | 9/1980 | Henriot | 340/994 |

FOREIGN PATENT DOCUMENTS

| | | | |
|---|---|---|---|
| 0219859 | 4/1987 | European Pat. Off. | 340/994 |
| 54-11878 | 5/1979 | Japan . | |

OTHER PUBLICATIONS

Transportation Bureau of Tokyo Metropolitan Government, "Bus Location System".

*Primary Examiner*—Parshotam S. Lall
*Assistant Examiner*—Thomas G. Black
*Attorney, Agent, or Firm*—Bernard, Rothwell & Brown

[57] ABSTRACT

The route bus operation controlling system of this invention includes mobile radio units, ground radio unit and central processor, wherein the central processor is provided with a memory for storing the actual running time of buses in specific section of each bus service route and other service information and a processing unit which reads out the service information stored in the memory to calculate coefficient data which allows comparison among delays in each bus route, applies a weight to the calculated result basing on the old and new actual values, calculated as sample values the average movement values of buses which have run in the specified section, calculates as sample values the expected values of the bus under forecast, and cumulates the expected running time for each specified section, and wherein the mobile radio units and ground radio units are provided with display units for displaying service information of a specific section of route and the entire route.

6 Claims, 13 Drawing Sheets

[$\ell_1$] : SAMPLE VALUE (EXPECTED VALUE) OF BUS UNDER INFERENCE $\ell_0$, $\ell_{-1}$ : SAMPLE VALUES (ACTUAL VALUES) OF PREVIOUS AND FURTHER PRECEDING BUS $S_1$, $S_0$, $S_{-1}$ : SPECIFIED SECTION ENTRY TIME (ACTUAL VALUES)

BUS UNDER TEST : $S_1$

PREVIOUS BUS : $S_0$

FURTHER PRECEDING BUS : $S_{-1}$

ROUTE BUS SERVICE CONTROLLING SYSTEM

BACKGROUND OF THE INVENTION

1. Field of the Invention

The present invention relates to a system for controlling a route bus service by first collecting information at passage points of buses running on a regular route according to a basic schedule, then estimating the time of arrival of each running bus at a terminal, subsequently modifying the basic schedule so as to enable the route buses to depart from the terminal sequentially at equal time intervals, and displaying service information such as a timetable and so forth on a service indicator installed in each bus.

2. Description of the Prior Art

In the current urban traffic where automobiles occupy a major position, there exist some serious urban problems including traffic congestion and so forth that result from overpopulated city structure, and it is of great importance to secure, in the highly dense urban road network, smooth service of transportation means such as route buses which are operated principally for the public.

Similarly in medium- and long-distance transportation means which serve for communication between cities, there may occur troubles that normal service conforming to a basic schedule fails to be achieved due to road construction or traffic accidents on regular routes.

In view of such circumstances mentioned above, one prior invention titled "Method for control of specific automobile service" is known as disclosed in Japanese Patent Publication No. 54-11878 (published on May 18, 1979).

FIGS. 1 through 3 illustrate a conventional apparatus designed for controlling the service of specific vehicles automobiles such as route buses. In FIG. 1, a central service controller 1 and ground receivers 2 . . . are connected to each other by means of circuit lines 3 . . . The ground receivers 2a, 2b, 2c are equipped with antennas 4a, 4b, 4c respectively and are installed at fixed intervals along a road 9 which is a route where buses 5 . . . run according to a basic schedule. In this example the route buses 5a, 5b, 5c are running sequentially in the order of service, and mobile radio units 7a, 7b, 7c equipped with antennas 6a, 6jb, 6c are installed in the buses 5a, 5b, 5c respectively together with service indicators 8a, 8b, 8c.

In the system having the above-mentioned constitution for controlling the operation of vehicles such as route buses, each of the service indicators 8a, 8b and 8c has such a display panel 10 as shown in FIG. 2. On the obverse side of the display panel 10, individual indication contents are exhibited with, for example, a departure indicator lamp 11 showing characters for "departure" and a standby indicator lamp 12 showing characters for "standby". Each of such indicator lamps 11, 12 internally has a blink means such as a light emitting diode. The display panel 10 is attached at an easy-to-see position for a driver in the route bus. Meanwhile, the driver ought to carry with him a service timetable 13 of FIG. 3 when leaving an office or the like to begin the daily route work. There are prepared several kinds of such timetables 13 which are different from one another depending on a schedule number column 14 and a day-of-week column 15 even for the same route. In the contents described on the timetable 13, a terminal name and stop names are shown in the uppermost row 16 . . . , and the times of passage at such bus stops are written respectively in the lower rows 17. The illustrated service timetable 13 represents an exemplary schedule No. 611 for Saturday. This timetable 13 prescribes that the bus departing from the office at 12:11 reaches a first stop "Tarumi" at 12:19, then leaves there at 12:21 after a two-minute rest to pass via a stop "Sannomiya" and reaches a turn point "Okamoto" at 12:51, subsequently leaves there at 12:56 after a five-minute rest and, via "Sannomiya" at 13:08, reaches "Tarumi" at 13:24. Ten minutes later, the bus departs from "Tarumi" at 13:34 and thereafter the service is kept according to the timetable.

The drivers on their duties with the above timetables 13 run the route buses 5a, 5b, 5c respectively according to the prescribed schedules with adjustment of the departure and arrival times of the buses in conformity to the instructions received from the service controlling system shown in FIG. 1.

Now the operation of the above service controlling system will be described below with reference to FIG. 1. First the radio waves transmitted from the running buses 5a-5c are caught by the antenna 4a-4c of the ground receivers 2a-2c installed at predetermined points on the road 9 of a service route. The waves from the buses 5a-5c are transmitted by the mobile radio units 7a-7c through the antennas 6a-6c at fixed frequencies selected with respect to the individual buses. Therefore the intervals between the route buses 5 running in the order of 5a, 5b, 5c are caught in the form of radio waves by the ground receivers 2a-2c, whose outputs are transmitted via the circuit lines 3 . . . to the central service controller 1. Then the controller 1 estimates the time required for the specific route bus to pass through the sections where the ground receivers 2a-2c are installed. Such estimation is executed by various computations based on the past data in such a manner that, for example, the time to be required for the bus 5c to pass through the section 9a between the ground receivers 2a and 2b is computed by averaging the actually required passage times of the preceding buses 5a, 5b through the section 9a. In another example, the time to be required for the route bus 5b to pass through the section 9b is estimated on the basis of the time actually required for the preceding route bus 5a to pass through the section 9b. In accordance with such estimations, service instructions are outputted from the central service controller 1 to the individual route buses 5a-5c. The instructions are exhibited by turning on the corresponding indicator lamps 11, 12 . . . in the display panels 10 of the service indicators 8a-8c. For example, when the route buses 5b, 5c pass through the ground receivers 2b, 2a, the instructions from the central service controller 1 are transmitted to the service indicators 8b, 8c via the ground receivers 2b, 2a through the antennas 6b, 6c and the mobile radio units 7b, 7c in the route buses 5b, 5c.

The central service controller 1 has a record of the mean time needed for buses to cycle the complete service route and the average speed, and calculates the expected arrival time at the ground receiver 2b coming from the ground receiver 2a using the following equation.

Expected arrival time = (Passage time at ground receiver 2a) + (1)

(Distance between ground receivers 2a and 2b)/

-continued (Average speed in this route section)

Accordingly, the bus drivers carrying the service time tables as shown in FIG. 3 actually run the buses by receiving the service instructions on the display panel shown in FIG. 2 so that the buses are operated at a constant interval in consideration of the traffic congestion in each route section 9a, 9b and so on of the road 9.

At each bus stop, users of bus have service information displayed on a display panel 19 provided on a road unit 18, as shown in FIG. 4, to know the situation of bus service on the route and expected time needed to go to the next bus stop. The road unit 18 is associated with the ground receiver 2 shown in FIG. 1, and it is made up of a box accommodating the ground receiver 2 and the display panel 19 attached on the front of the box. The display panel 19 consists of an approach message section 19a and a service interval message section 19b. For example, the road unit at the bus stop with the ground receiver 2b has its display panel 19 indicating "BUS WILL ARRIVE SOON" in the approach message section 19a in response to the detection of passage of the bus 5c at the former ground receiver 2a and also indicating the expected time needed for the coming bus to go to the next bus stop, e.g., ground receiver 2c. The road unit also has on its display panel 19 digital indication of the lapse of time since the preceding bus 5b has passed by the ground receiver 2b in the service interval message section 19b.

The foregoing route bus service controlling system, however, has the following problems. The first problem is that in calculating the lapse of time taken by a bus for running through a unit segment such as between ground receivers 2a and 2b using the statistical average speed for the entire cycle of route, the expected lapse of time calculated as (Distance between ground receivers 2a and 2b)/(Statistical average speed in this section) is not always equal to the actual lapse of time estimated (Distance between ground receivers 2a and 2b)/(Running speed in this section) as in the occurrence of traffice congestion or traffic accident.

Namely, $$\text{(Distance between ground receivers 2a and 2b)/(Statistical average speed in this section)} \neq \text{(Distance between ground receivers 2a and 2b)/(Running speed in this section)} \quad (2)$$

Such a situation causes a significant difference between the service information calculated by the central service controller 1 and displayed on the route unit at each bus stop and the actual result, resulting in a degraded dependability on the displayed service information for the users and bus drivers.

In connection with the above problem, it was unclear in the determining up to what time passage data should be traced back for evaluating the statistical average speed in each route section. Because of different traffic conditions of route sections such as the degree of traffic congestion and the distance of route section, it is not possible to provide accurate service information for the bus drivers, passengers and users waiting at each bus stop through the inference based simply on the Equation (1).

Among displayed information on the display panel 19 of the road unit 18 at each bus stop, as shown in FIG. 4, information in the approach message section 19a is particularly lacking in accuracy. Namely, when a user waits for a bus at a bus stop with a road unit 18n having an associated display panel 19n and a bus is passing by the previous road unit 18n-1, the user watches the road unit 18n to read in the approach message section 19a "BUS WILL ARRIVE SOON", but the expression "SOON" is ambiguous because the wait time depends on the traffic condition between the road units 18n-1 and 18n. This means that the user does not know clearly whether the intended bus will come one minute, three minutes or five minutes later, and the user is compelled to infer the arrival time of the coming bus using information such as the lapse of time since the last bus has gone and time taken to go to the next bus stop displayed on the service interval message section 19b and the service timetable posted at the bus stop.

Moreover, the service instruction using the lamps 11 and 12 on the display panel 10 of the operation instruction unit 8 as shown in FIG. 2 does not tell the bus driver on what service diagram the bus should be run. On this account, the bus driver is required to make up an approximate service plan based on the timetable 13 shown in FIG. 3 and in consideration of a delay at that time point, which sometimes forces the driver to make a full-speed ride once the departure lamp 11 has lighted, in order to catch up with the schedule. The conventional service instruction has been not only difficult for the bus drivers, but it has compromised the matter of security in the traffic system inclusive of the passengers and other vehicles.

SUMMARY OF THE INVENTION

A first object of the present invention is to provide a route bus operation controlling system in which the scheduled running time for certain route sections of the entire route and the actual running time are memorized in the central operation processor and the running time for the unit section is inferred and displayed based on these values using inference equations so that the error of the service message or service instruction from the actual running time for the unit section is prevented.

A second object of the present invention is to provide a route bus service controlling system in which the running time for the unit section is inferred and displayed based on the scheduled running time and actual running time of the unit section using the inference equations, instead of using the inference equations based on the average speed in the entire route, thereby enhancing the accuracy of inference and also extending the application of the inference equation to other sections.

A third object of the present invention is to provide a route bus service controlling system in which the expected arrival time or expected running time of bus service is displayed on the display panel installed at each bus stop so as to provide useful service information for the users.

A fourth object of the present invention is to provide a route bus service controlling system in which the expected running time to the next bus stop or a certain position on the route is displayed for the bus driver or other staff so that the bus driver can run the bus easily, and at the same time an accurate running time in each section of route is informed to the passenger.

In order to achieve the above objectives, the inventive route bus operation control system includes the aforementioned mobile radios, ground receivers and central service processor, wherein the central service processor is provided with a memory which stores the actual running time spent in passing through a unit section of a service route and other service information and a processing unit which reads out various service information in the memory to calculate factor data useful for the comparison of delay on each bus route, apply weight to the calculated data based on the old and new actual values, calculate the average movement value of the running bus in the specific section as a sample value, and accumulate the expected running time of each specific section, and wherein the mobile radios and ground receivers and provided with display units for displaying service information pertinent to the specific section and the entire route.

DESCRIPTION OF THE PREFERRED EMBODIMENTS

Several preferred embodiment of this invention will be described with reference to the drawings.

Figure 1:
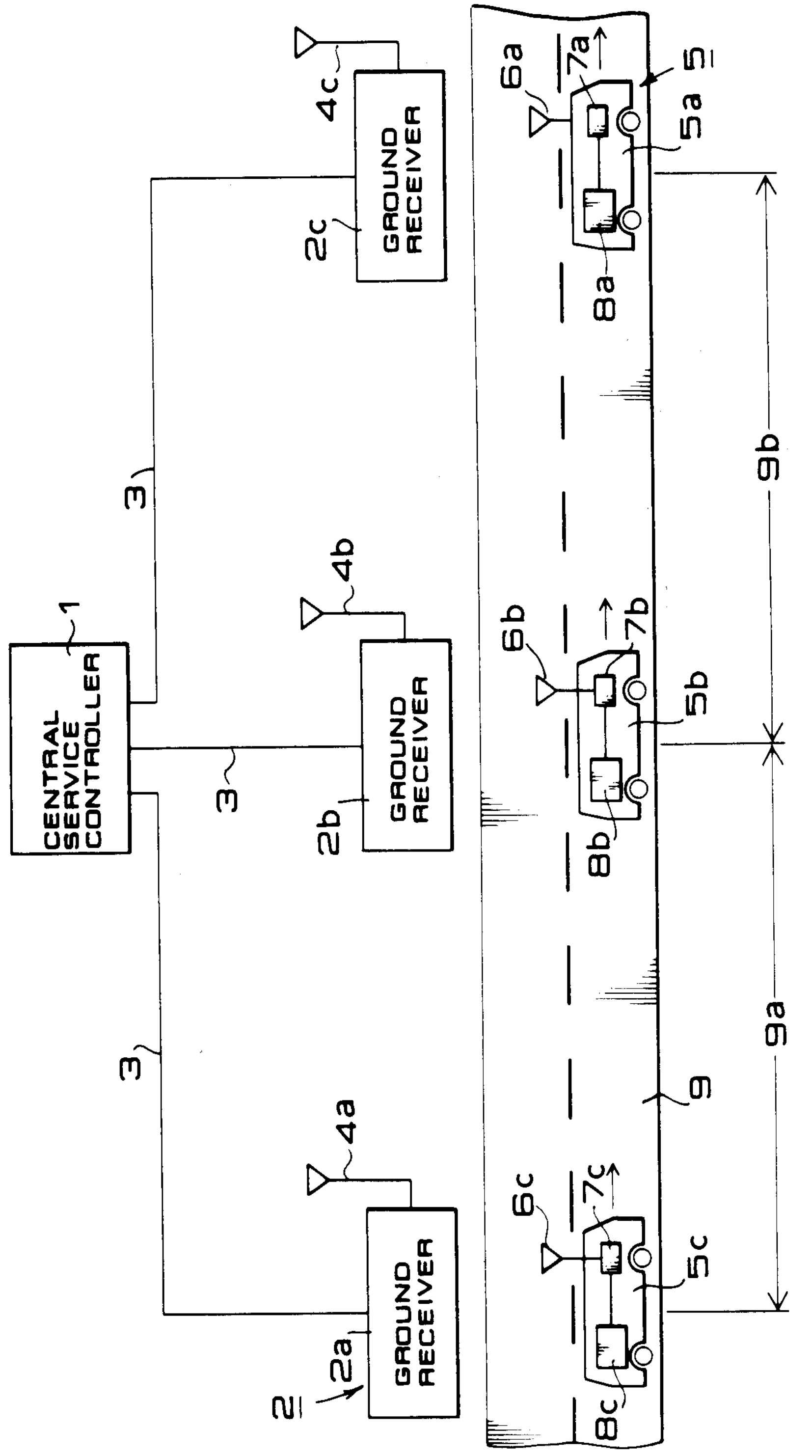
FIG. 1 (PRIOR ART)
FIG. 1 is a block diagram showing the overall arrangement of a conventional route bus service control system.
Figure 2:
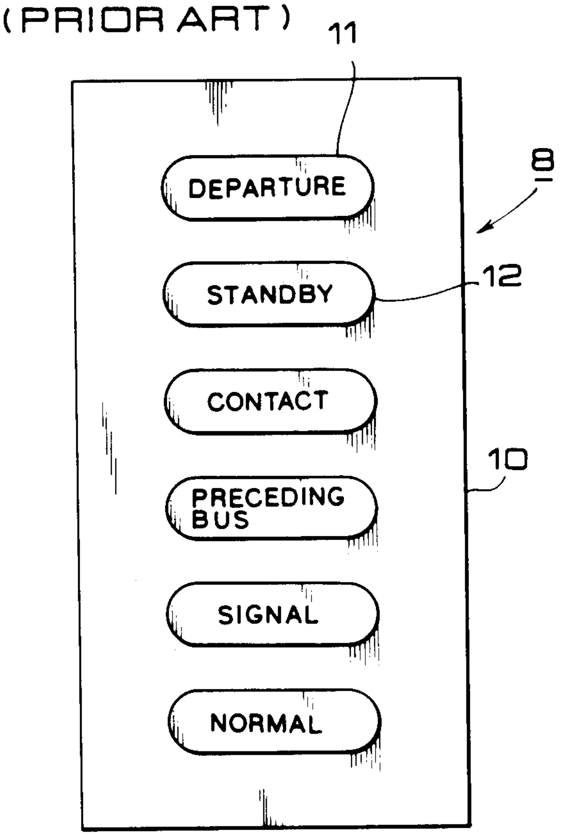
FIG. 2 (PRIOR ART)
FIG. 2 is a front view of the service instruction unit installed on the vehicle.
Figure 3:
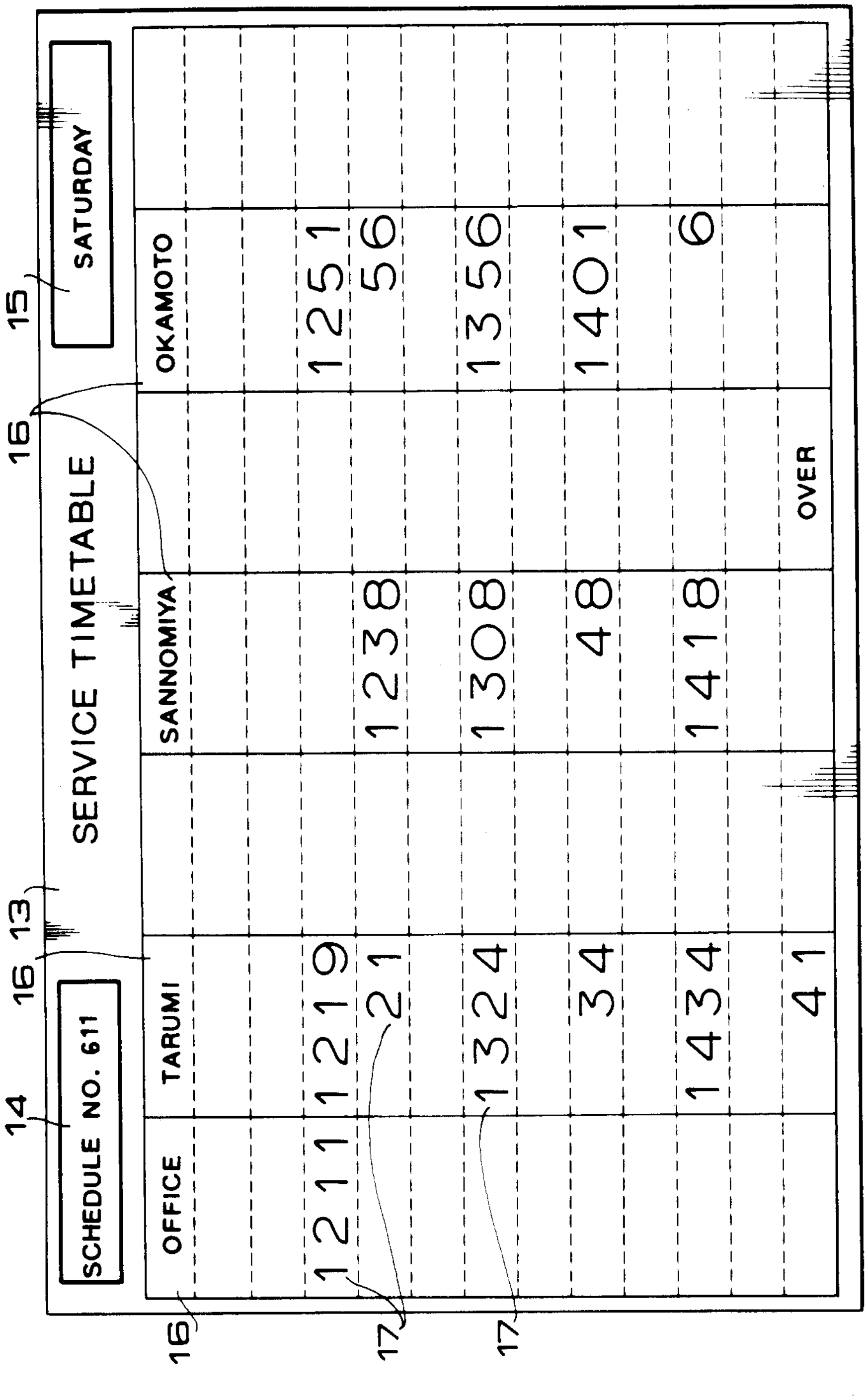
FIG. 3 (PRIOR ART)
FIG. 3 is a diagram showing the service timetable carried by the bus driver during the service to which the control system of FIG. 1 is applied.
Figure 4:
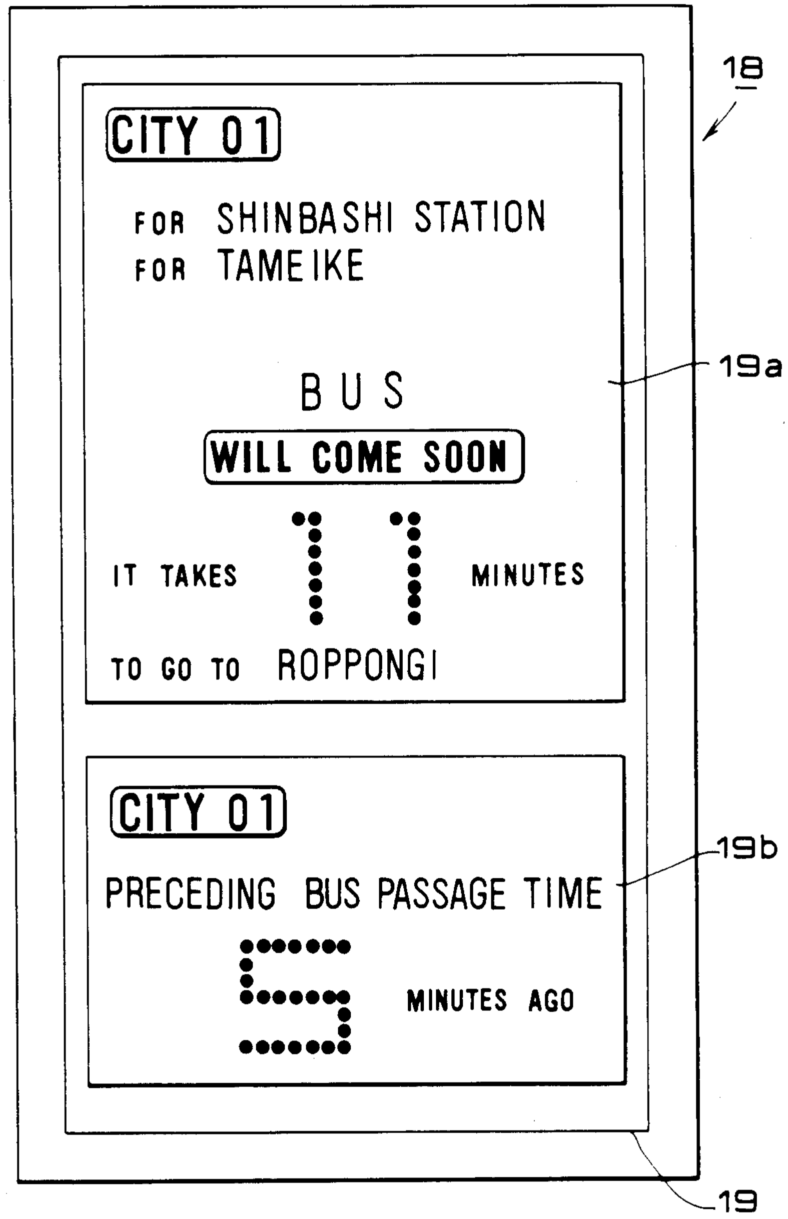
FIG. 4 (PRIOR ART)
FIG. 4 is a front view of the user message display unit installed at each bus stop in the conventional service controlling system shown in FIG. 1.
Figure 5:
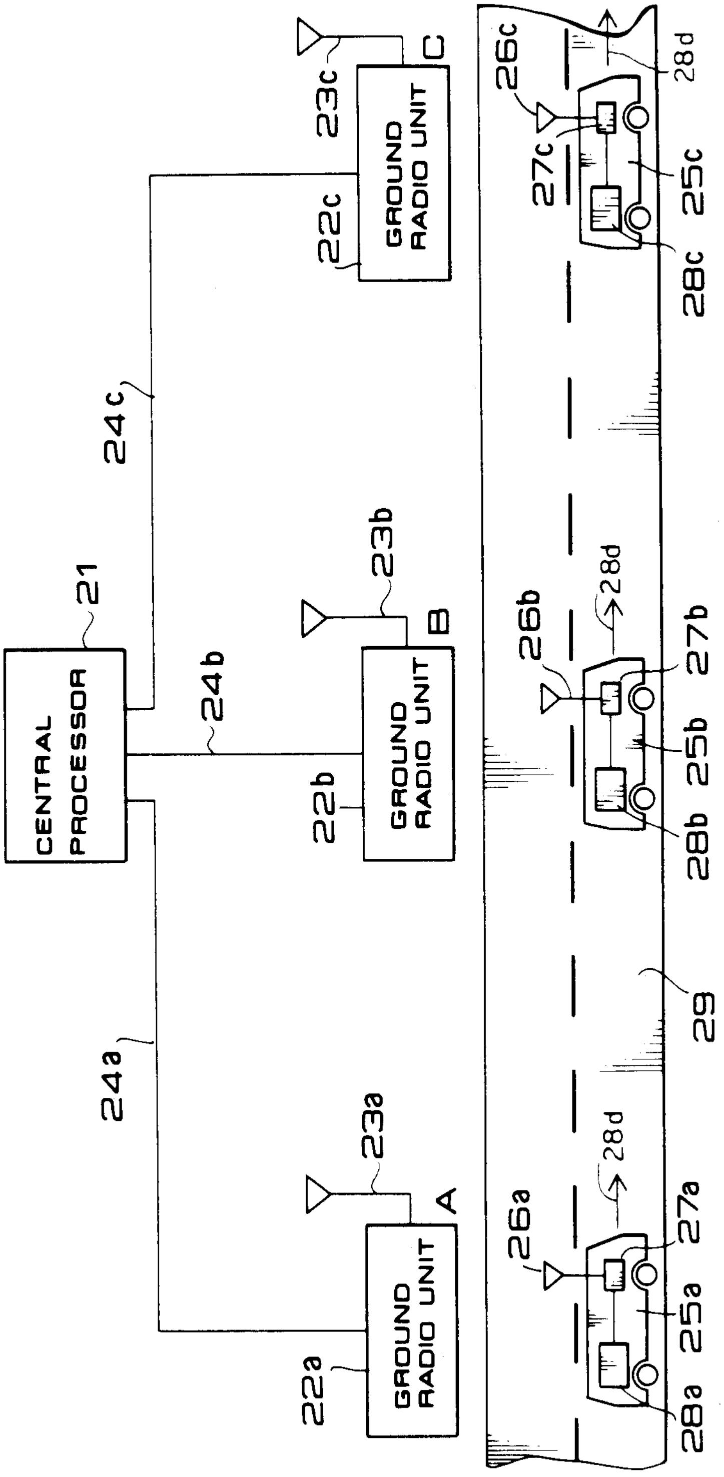
FIG. 5 is a block diagram showing the overall arrangement of the route bus service controlling system which is the first embodiment of this invention.

The first embodiment will be described using FIGS. 5, 6 and 7. In FIG. 5, reference number 21 denotes a central processor; 22*a*, 22*b* and 22*c* are ground radio units installed at locations A, B and C, respectively; 23*a*, 23*b* and 23*c* are antennas of the ground radio units 22*a*, 22*b* and 22*c*; 24*a*, 24*b* and 24*c* are lines for connecting the ground radio units 22*a*, 22*b* and 22*c* to the central processor 21; 25*a*, 25*b* and 25*c* are route buses; 27*a*, 27*b* and 27*c* are mobile radio units installed on the buses 25*a*, 25*b* and 25*c*, respectively; 26*a*, 26*b* and 26*c* are antennas of the mobile radio units 27*a*, 27*b* and 27*c*, respectively; 28*a*, 28*b* and 28*c* are service indicators on the buses 25*a*, 25*b* and 25*c*, respectively; the arrows 28*d* indicate running direction of the buses 25*a*, 25*b* and 25*c*; and 29 is the running route of the buses 25*a*, 25*b* and 25*c*.

Figure 6:
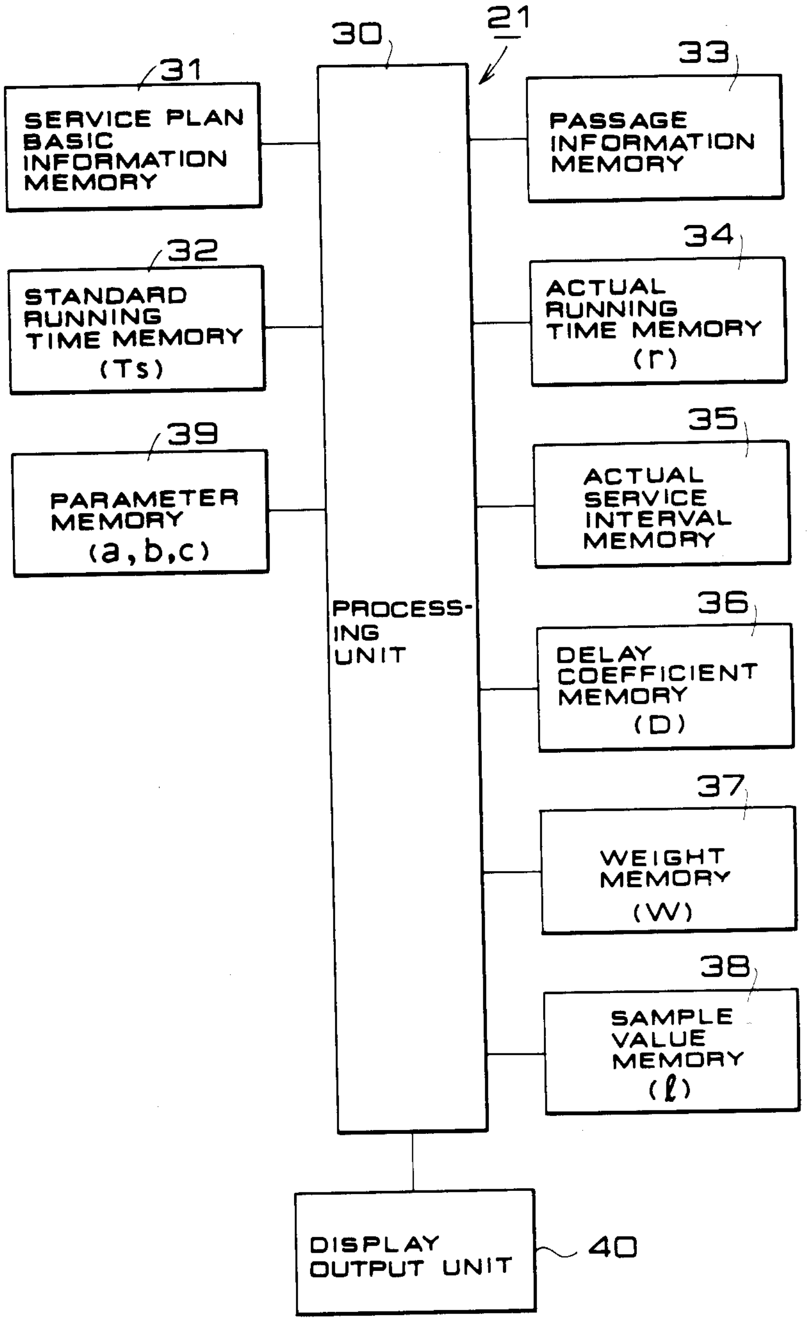
FIG. 6 is a block diagram showing the arrangement of the central service of the first embodiment.

FIG. 6 shows the arrangement of the central processor 21. The central processor 21 consists mainly of a processing unit 30 such as a microprocessor, and it controls reading and writing of data to the memories 31–39, performs computation for data stored in the memories 31–39 and stores the result in the memories. Among the memories, 31 is a basic information memory provided for each location and route, and it stores the vehicle number, passage time and service diagram number. 32 is a standard running time memory provided for each location and route, 33 is a passage information memory for storing the vehicle number of the passing bus, passage time and service diagram number, 34 is an actual running time memory provided for each location and route, 35 is an actual service interval memory provided for each route, 36 is a memory for storing the delay factor normalized for the standard running time, 37 is a memory for storing the weight applied to the actual value, 38 is a sample value memory for storing the average movement value (sample value) of the running vehicle in the unit segment of a route, and 39 is a parameter memory for storing the parameters used in the weight calculation and sample value calculation. Reference number 40 denotes a display output unit which receives the vehicle number, route diagram number and arrival or departure time from the processor 30 and drives the display unit for the service manager (not shown) and the display unit installed in the terminal station and major bus stops (not shown).

Next, the operation will be described. The mobile radio units 26*a*, 26*b* and 26*c* are installed on the buses 25*a*, 25*b* and 25*c*, respectively, the ground radio units. 22*a*, 22*b* and 22*c* making communication with the mobile radio units 26*a*, 26*b* and 26*c* are disposed on the route 29, and the central processor 21 is installed in the office. The central processor 21 collects the bus passage information from the ground radio units 22*a*, 22*b* and 22*c* over the lines 24*a*, 24*b* and 24*c*, and the information is processed by the processing unit 30 and stored in the passage information memory 33. The passage information (for each vehicle number, for each location and for each service diagram number) for each bus passing the locations A, B and C is stored in the passage information memory 33 while being collated with the contents of the service plan basic information memory 31. Among data accumulated in the passage information memory 33, only necessary data is read out for computation by the processor 30, and the result is stored in the actual running time memory 34.

After the bus 25*a* has passed the location A, the system determines the arrival time of the bus at the location B in the following way. For the inference calculation of the running time between locations A and B, relatively new actual value made by previous bus (25*b*, 25*c*, . . . , or 25*n*) which has passed the location B is used after modification. The calculation is implemented using "delay factor", "weight" and "average movement value, i.e., sample value", all defined in the following.

Generally, the standard running time of route buses between locations is scheduled in advance and it varies depending on the hour and route. The actual running time of a bus between locations A and B also varies depending on the hour and route, and therefore a value compared with some reference value needs to be used. In this embodiment, the reference running time is defined as delay factors $D_i$ as follows.

$$D_i=r_i/T_s\ (i=0,\ -1,\ -2,\ \ldots) \quad (3)$$

where $r_i$ is actual running time and $T_s$ is the standard running time.

In FIG. 5, the previous buses 25*b*, 25*c* and so on (not shown) have their actual running time $r_0$, $r_{-1}$ and $r_{-2}$, respectively, and these values are read out from the actual running time memory 34 as shown in FIG. 6, and the standard running time $T_s$ is read out from the standard running time memory 32. The processor 30 makes computation using these values to evaluate delay factors $D_0=r_0/T_s$, $D_{-1}=r_{-1}/T_s$ and $D_{-2}=r_{-2}/T_s$, and stores them in the delay factor memory 36.

For the inference of the running time in each unit segment (between locations A and B and between B and C in FIG. 5), the conventional system has simply used the mean value of the actual running time in the past. In this invention, the actual running time in the past is used by setting a finite time frame. The bus service is different in the interval of service depending on each route and segment. For example, buses may run at an interval of three minutes or at an interval of 30 minutes, and this causes different number of samples of the actual data used. Accordingly, actual data must be used to meet the features of each route and section. The road traffic varies time to time, and the use of too old actual data may not match the current situation. The latest actual data best reflects the traffic situation of that time point, and this invention confines the time frame and applies weight to the actual data in extracting the actual data. The weight is larger for a newer actual value and smaller for an older actual value. The weight Wi is defined as a function of the service interval as follows.

$$W_i = a + (s_i - s_{i-1})/b \quad (W_i \text{ max is } 1.0) \quad (4)$$

$$a \leqq W_i \leqq 1$$

$i = 0$ for previous bus, $i = -1$ for next preceding bus $i = -2$ for further preceding bus where a is a weight compensating coefficient, b is an upper limit of service interval, and s is the arrival time of bus at location A.

$s_0$ and $s_{-1}$ are the arrival time of the preceding buses 25*b* and 25*c* at location A in FIG. 5, and a and b are parameters. a is the weight of the arriving buses when $s_0=s_{-1}$, namely when the preceding buses 25*b* and 25*c* have arrived at the same time, and b is the upper limit of the service interval used for taking data of the most preceding bus. For example, for b=30 (minutes), $a=\frac{1}{3}$, and $s_0-s_{-1}\geqq 20$ (minutes), the previous bus 25*b* has a weight of $W_0=1$. When the service interval is short, the number of samples increase, causing the weight to disperse, while when the operation interval is long, the number of samples decreases, causing actual data of buses more immediate to the bus under inference to have larger weights. The weight of each preceding bus is calculated using Equation (4), and the resultant weights are stored in the weight memory 37. The actual running time between locations A and B will fluctuate even in the same hour of day depending on the number of passengers, waiting for signals and other traffic conditions, and in this invention the inference calculation for the arrival time uses the average movement value (will be termed "sample value" hereinafter) for the preceding buses.

The following defines the sample values for the preceding buses 25*b* and 25*c*.

$$l_0 = W_0D_0 + (1 - W_0)l_{-1} \quad (5)$$

$$l_{-1} = W_1D_{-1} + (1 + W_{-1})l_{-2} \quad (6)$$

where $l_0$ is the sample value of previous bus 25*b*, $l_{-1}$ is the sample value of the preceding bus 25*c*, and $l_{-2}$ is the sample value of the further preceding bus (not shown), $W_0$ and $W_{-1}$ are weights for the previous and preceding buses 25*b* and 25*c*, and $D_0$ and $D_{-1}$ are delay factors for the previous and preceding buses 25*b* and 25*c*.

For the sample values of the preceding buses, weights are read out of the weight memory 37, delay coefficient are read out of the delay coefficients memory 36, and the processor 30 calculates the Equations (5) and (6), and the results are stored in the sample memory 38. The forecasting calculation for the arrival time of the bus under inference at the location B is carried out using the sample values of the preceding buses and the sample value $l_1$ (forecasting value) of the bus under forecasting derived from the passage time of the preceding buses at the location A.

Figure 7:
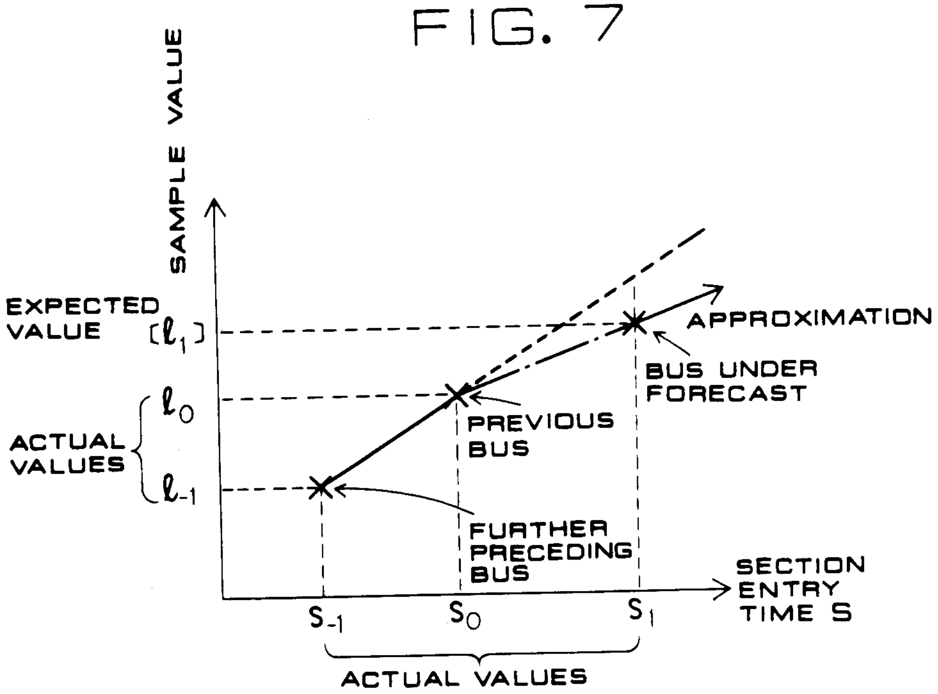
FIG. 7 is a diagram showing the principle of calculating the expected running time according to the first embodiment.

FIG. 7 is a graph showing the relation between the sample values and section entry time which is the passage time of the bus under forecast at the location A in FIG. 5. The section entry time of the bus under inference and preceding buses is plotted on the horizontal axis against the sample values of these buses on the vertical axis. From FIG. 7, the sample value l1 of the bus under forecast is given as follows.

$$\frac{l_1 - l_0}{s_1 - s_0} K \cdot \frac{l_0 - l_{-1}}{s_0 - s_{-1}} \text{ namely,} \quad (7)$$

$$l_1 = l_0 + K \cdot \frac{l_0 - l_1}{s_0 - s_{-1}} \cdot (s_1 - s_0)$$

where K is the gradient of the line. Although K is the gradient of the line, it is approximated by the gradient of a quadratic curve for simplification of calculation, as follows.

For $s_i < s_o + c$, $$k = 1 - \frac{s_i - s_0}{2c}\ (i = 1, 2, 3, \ldots) \quad (8)$$

For $s_i \geqq s_o + c$, $$k = 0.5\ (\text{since } s_i = s_0 + c) \quad (9)$$

where c is the upper limit of forecast.

The running time (forecast value) of the bus 25*a* between the locations A and B is equal to the sample value $l_1$ multiplied by the standard running time $T_s$, between A and B, i.e., $l_1 \times T_s$. Accordingly, the passage time of the bus 25a at the location B is equal to the passage time at location A plus the running time between A and B as, $$\text{Passage time at location } B = s1 + l_1 \times T_s \qquad (10)$$

Accordingly, the passage time of the bus 25a at the location B is forecasted as follows. The sample values of the preceding buses shown in FIG. 6 are read out of the sample memory 38, the passage time of the bus 25a and preceding buses at the location A is read out of the passage information memory 33, the parameter c is read out of the parameter memory 39, Equations (7), (8) and (9) are calculated by the processor 30, the sample value $l_1$ of the bus 25a is stored in the sample memory 38, and finally Equation (10) is calculated by the processor 30. In the same way, the passage time of the bus 25a at the location C is obtained by cumulating the forecasted running time for the specified sections between A and B and between B and C.

The passage time for locations farther than the location C can be calculated by cumulating the expected running time of each specified section using the actual values experienced by the preceding buses. The result of process for the expected passage time of the bus under inference by the processor 30 shown in FIG. 6 is read out of the service plan basic information memory 31 and displayed together with the actual values retrieved from the passage information memory 33 on the display unit 40, and the scheduled passage time at each location on the route of the buses 25a–25c and their actual values can be displayed. This allows tracing control for the service of each bus, which is displayed on the CRT screen in the office, and the expected departure time and arrival time can be displayed on the display units installed at bus stops on the route through the lines 24a, 24b and 24c from the central processing unit 21.

Although in the above embodiment the sample value (expected value) of the bus under inference is calculated through the approximation of the gradient K of the line for Equation (7) by the quadratic curve in the Equations (8) and (9), approximation with other functions for simplifying the calculation will achieve the same effect as of the above embodiment.

Although in the above first embodiment the computational process for obtaining the passage time of a bus at a specific location of the route has been described, it is also possible to calculate the service interval of buses through the inference of the number of buses passing at a certain location in a certain time length, as will be described in the following second embodiment.

Figure 8:
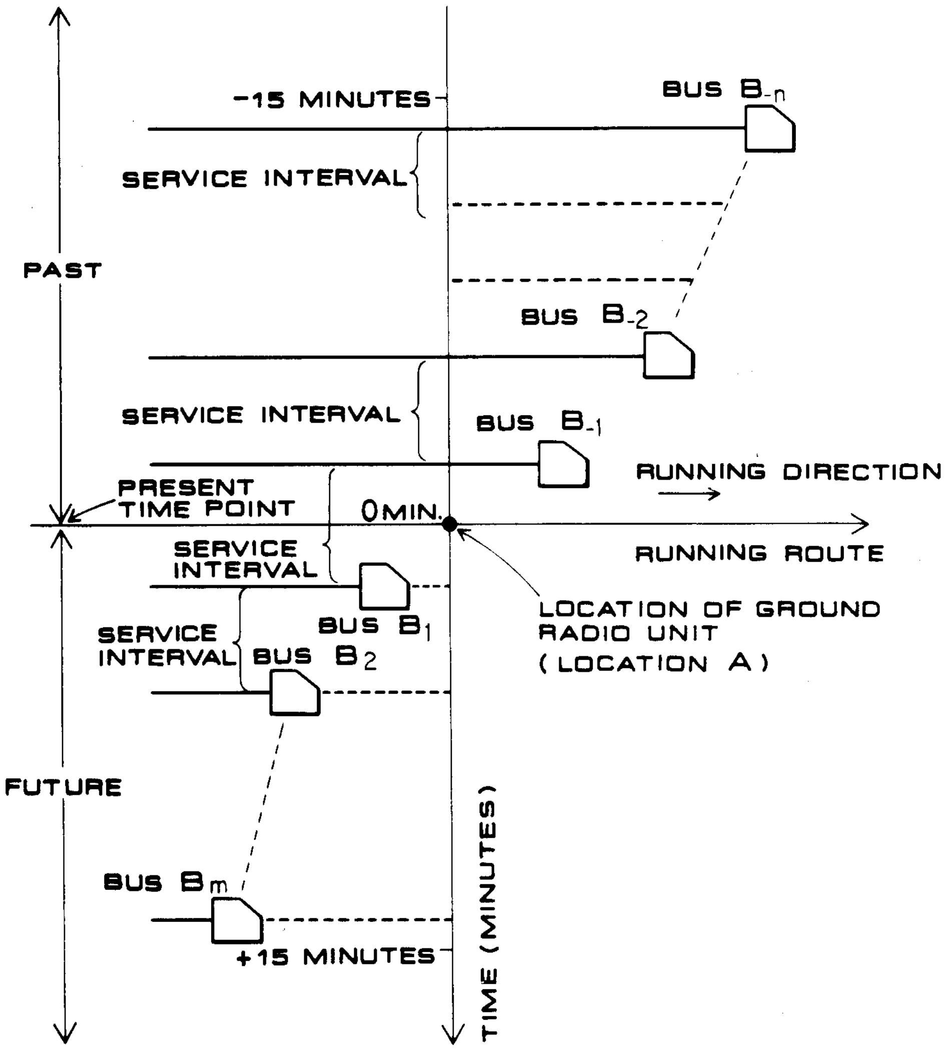
FIG. 8 is a diagram showing the principle of calculating the route bus service interval time according to a second embodiment of this invention.

FIG. 8 shows the principle of calculating the service interval of buses according to the second embodiment of this invention. The vertical axis represents time (in minutes), the upper half being the actual number of buses which have passed in the past in front of the guidance display unit, while the lower half represents the expected number of buses which will pass in front of the guidance display unit. The position of the approach guidance display unit is conceived to be a 0 minute position on the horizontal axis. For example, the following is the case of buses passing the location A. In the figure, $B_{-1}, B_{-2}, \ldots, B_{-n}$ are buses which have passed in front of the approach message display unit in the past 15 minutes, and $B_1, B_2, \ldots, B_m$ are buses which will pass in front of the approach guidance display unit in the coming 15 minutes. When buses are in the positional relation as shown on the position vs. time coordinates in FIG. 8, the service interval t (minutes) of buses passing in front of the approach guidance display unit is expressed as follows.

$$t = 30/(n+m) \qquad (11)$$

where n is the number of buses which have passed in the past 15 minutes, and m is the number of buses which are expected to pass in the coming 15 minutes.

The central processing unit 21 collects the passage information of buses which pass in front of the ground radio units 22a, 22b and 22c by a poling signal having a certain frequency, and therefore by transmitting the service interval data calculated using the Equation (3) to the ground radio units 22a, 22b and 22c via the lines 24a, 24b and 24c at a certain time interval (e.g., one minute), the service interval displayed on the approach guidance display unit (will be described later) is updated continuously and the service interval which best reflects the traffic situation is displayed.

Although the above first and second embodiments have been described for the case of route bus service in a linear specific section of the route, this invention is also applicable to the specific section where buses turn back in the vicinity of the bus terminal which is the service reference point of the route bus, as will be described in the following third and fourth embodiments in connection with FIGS. 9 and 10.

Figure 9:
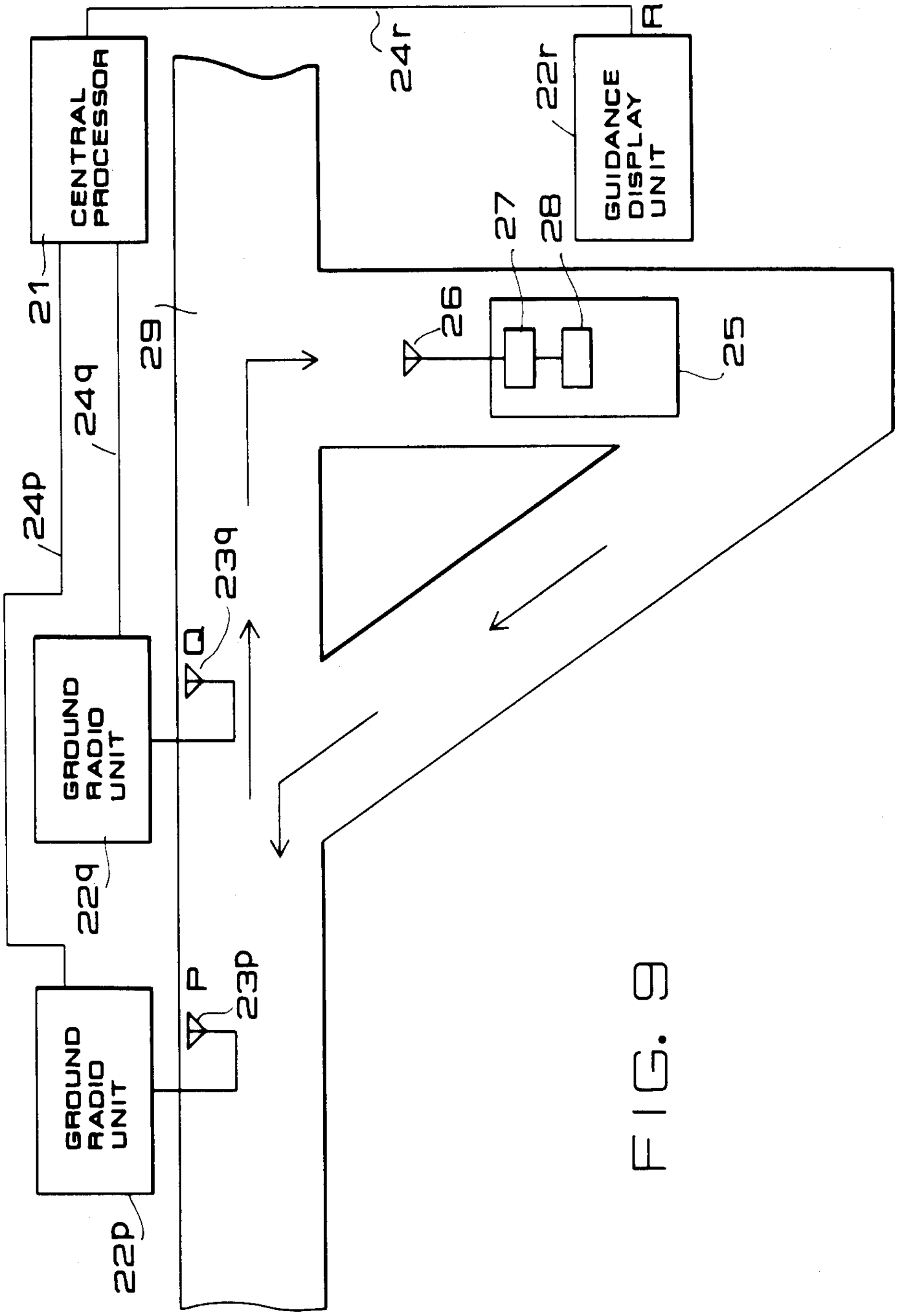
FIG. 9 is a block diagram used to explain the overall arrangement of a the third embodiment of the invention used for operation control in the neighborhood of the terminal station.

In FIG. 9 for the third embodiment of this invention, identical components to those shown in FIG. 5 are referred to by the common symbols. When a bus has passed the arrival forecast point P in the vicinity of the bus terminal station, communication is made between the ground radio unit 22P and the mobile radio unit 27 on the bus 25 via the antenna 23P on the ground and the antenna 26 on the vehicle, so that the bus passage information is sent via the line 24p to the central processing unit 21 and the expected arrival time of the bus at the terminal station is determined using the above forecast equations.

Figure 10:
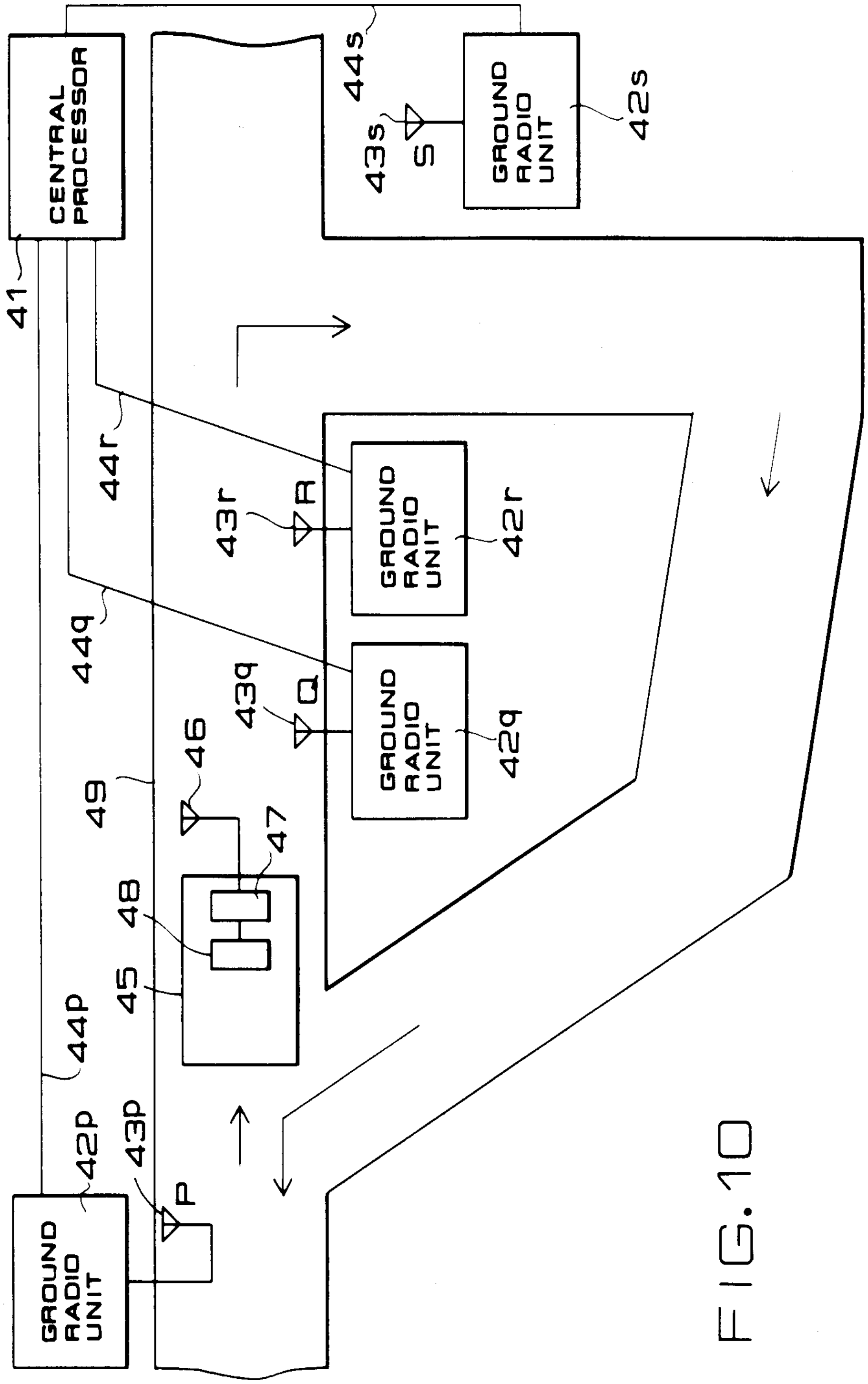
FIG. 10 is a diagram showing the disposition of devices in the neighborhood of the terminal station according to a fourth embodiment of the invention.

FIG. 10 shows the device disposition at the terminal station and in the vicinity of the terminal station according to the fourth embodiment of this invention. In the figure, reference number 41 denotes the central processing unit, 42p–42s are ground radio units, 45 is a route bus, 47 is a mobile radio unit, 48 is an service instruction unit, 43p–43s antennas, 44p–44s are lines, 46 is a mobile antenna, 49 is a running route, P, Q, R and S are ground radio unit installation points, and the arrow indicates the bus running direction.

Figure 11:
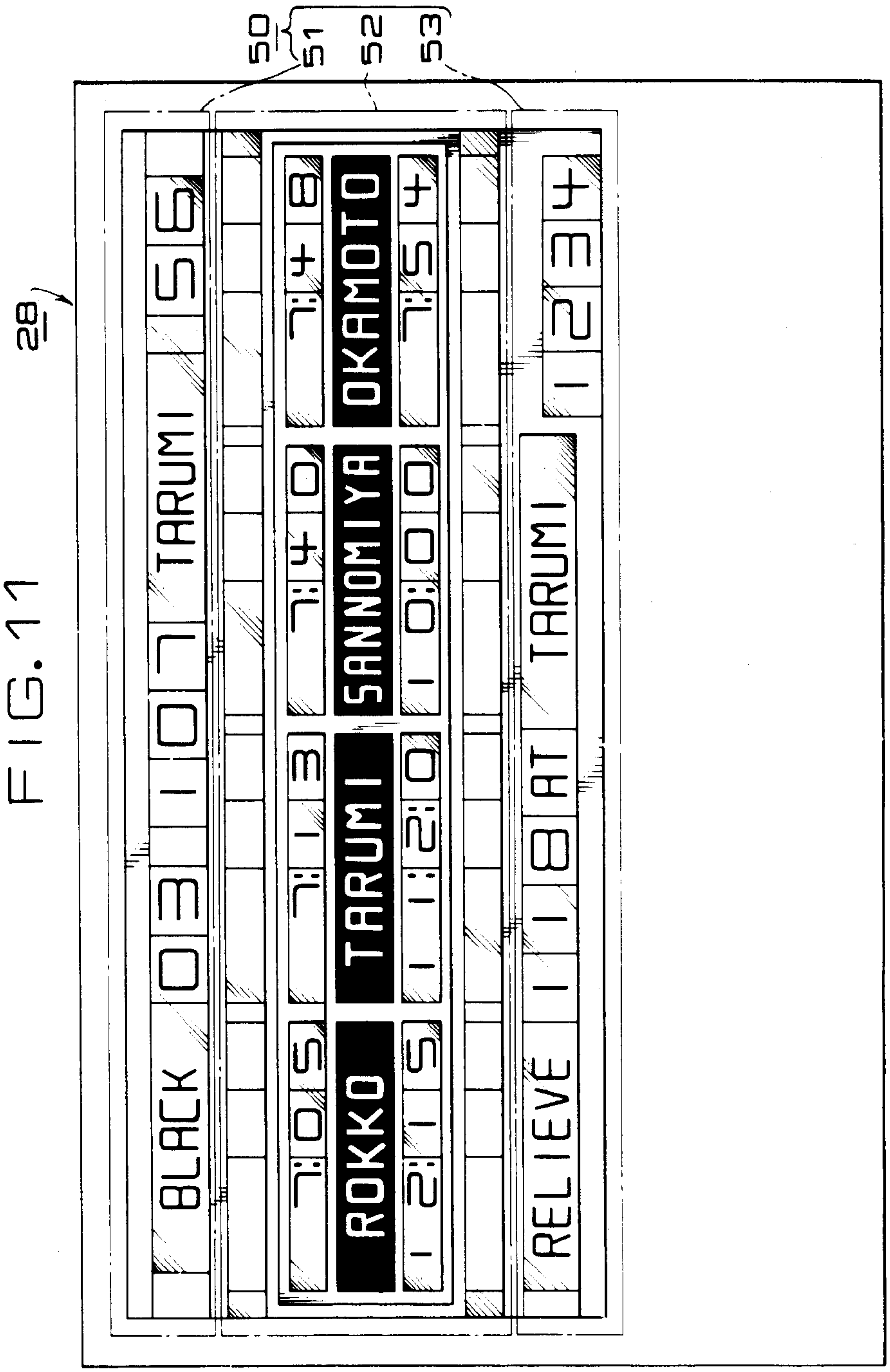
FIG. 11 is a front view of the display unit installed in the bus according to a fifth embodiment of this invention.

FIG. 11 shows the service instruction unit 28 equipped on the route bus according to the fifth embodiment of this invention. In the figure, the display unit 50 consists of an incoming information display section 51, an service time display section 52 and other information display section 53.

FIGS. 12 through 15 show the modified versions of the display unit installed at bus stops according to the sixth through ninth embodiments of this invention, in which like symbols indicate like components throughout the figures.

Figure 12:
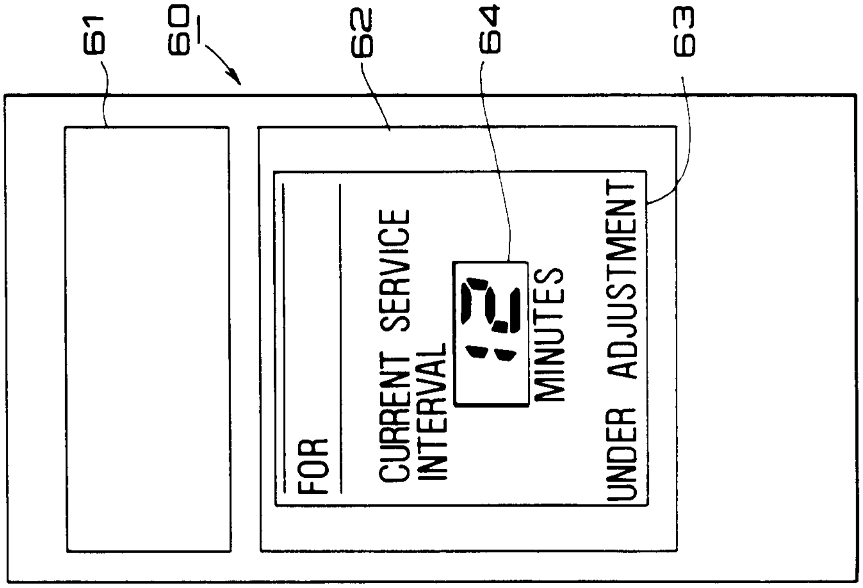

In the sixth embodiment shown in FIG. 12, a ground radio unit 61 is accommodated inside the road unit 60, and a display unit 62 is placed below the ground radio unit 61. In this embodiment, the display unit 62 is used for a bus stop where only one service route is placed, and its display panel 63 has a print of invariable information such as the destination of bus, and it also has a digital display panel 64 at the central section thereof on which operational information based on the computation by the central processing unit 21 or 41, as has been described in the previous first through fourth embodiments, is displayed by means of liquid crystal or light emitting diode devices.

Figure 13:
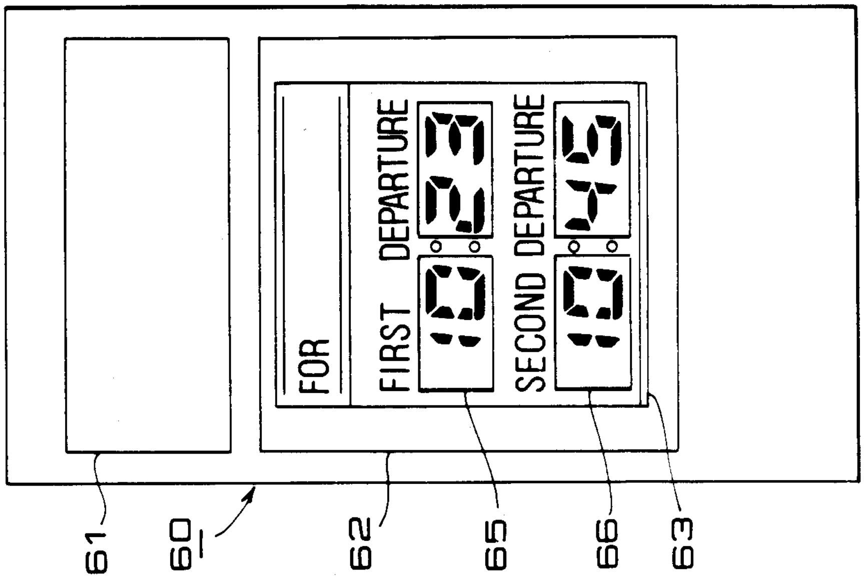
FIGS. 12 through 15 are diagrams each showing the front view of the user guidance display unit installed at each bus stop according to the sixth through ninth embodiments of this invention.

In the seventh embodiment shown in FIG. 13, the display unit 62, which displays the service time derived from the actual values and expected values processed by the central processor 21 or 41, as described in the previous first through fourth embodiments, has its display panel 63 provided with a departure time display section 65 for a bus which has arrived at that bus stop earlier and will depart first and a departure time display section 66 for a bus which will depart later.

Figure 14:
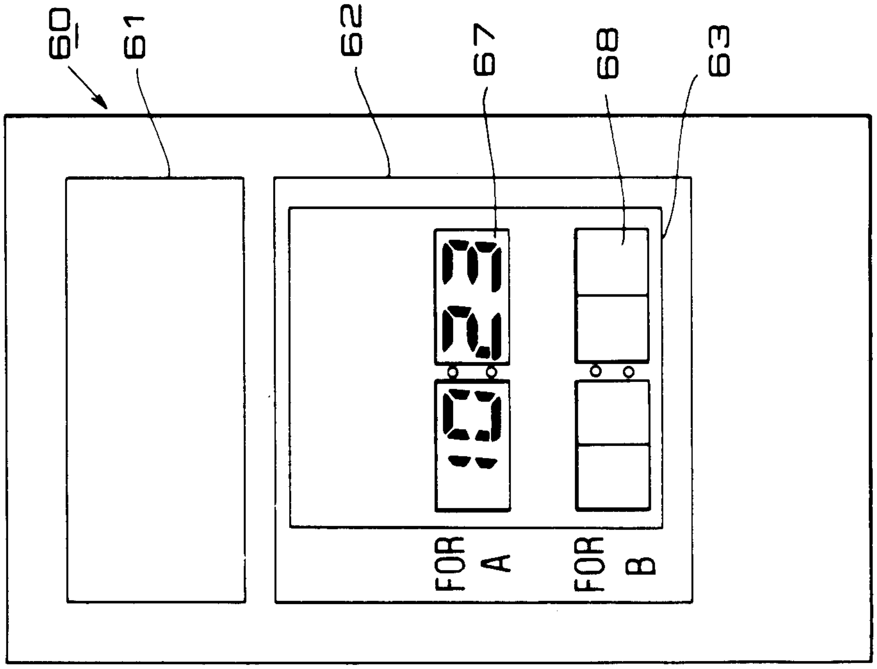

In the eighth embodiment shown in FIG. 14, a display unit 62 is installed at a bus stop where two routes of bus service are placed, and the upper part of the display panel 63 is provided with a first display section 67 for displaying the arrival, or departure time of the earliest bus among route buses/destined for A, and the lower part is provided with a second display section 68 for displaying the arrival or departure time of a bus destined for B.

Figure 15:
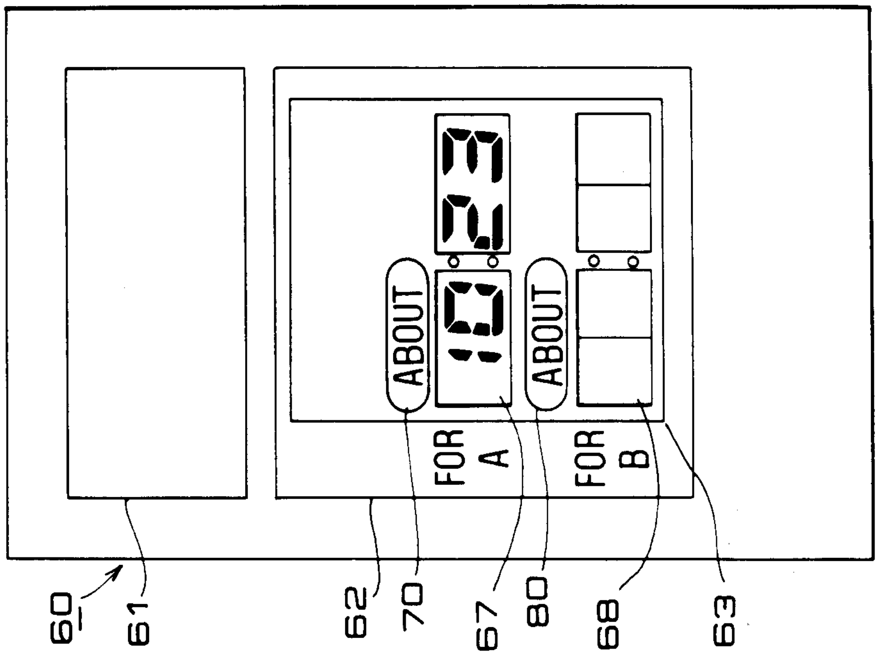

Finally, the ninth embodiment shown in FIG. 15 is a modified version of the eighth embodiment shown in FIG. 14, and reference numbers 60–63, 67 and 68 are the same in both embodiments. In the vicinity of the first display section 67, there is provided a first indicator lamp 70 having a label of "ABOUT", and a second indicator lamp 80 similar to 67 is provided in the vicinity of the second display section 68. These lamps 70 and 80 light up when the expected arrival or departure time of a bus for location A transmitted from the central operation processor 21 or 41 varies from time to time, indicating that the time displayed in the section 67 or 68 is still uncertain. For example, information displayed on the display unit at the bus stop of location S in the fourth embodiment is uncertain until the bus 45 from location P has passed location Q, but after the passage of location R the accuracy of information will be significantly high, and therefore the indicator lamp 70 or 80 is turned off after the bus has passed the location R so that the user is informed that time information displayed in the display section 67 or 68 is relatively reliable.

As described above in detail, the inventive route bus service controlling system provides the following effectiveness.

Firstly, the running time in a specific section of a bus service route is calculated using equations based on the scheduled running time and actual data obtained by several buses which have run in the past and the forecasted running time is displayed on the display unit, which prevents an error of the service guidance message and service instruction information from the actual running time, whereby the reliability of the service instruction and guidance information for the bus driver and passenger can be improved significantly.

Secondly, the forecast calculation for service information is based on the scheduled running time in a specific section of the overall route and the actual data obtained by buses which have run the section, which allows the enhanced accuracy of forecast and application to other sections, whereby versatility and usefulness can be improved significantly.

Thirdly, the expected arrival time or expected running time between the bus stops of the route bus is displayed accurately on the display panel of the road unit installed at the bus stop, which provides accurate service guidance information for the user, whereby the usefulness for the route bus user can be improved.

Finally, as the fourth effect, an accurate expected running time or arrival time at the next bus stop or specific location is displayed on the display unit installed on the vehicle, which provides accurate service information for the bus driver and passengers, whereby the usefulness can be improved also in this respect.

What is claimed is:

1. A route bus service controlling system including a mobile radio unit equipped on a route bus, ground radio units installed at certain intervals of distance along the entire route of the bus, a central processor which calculates expected operational information for a specific section of said route based on passage information provided by said mobile radio unit and ground radio units, and a plurality of display units for displaying said expected operational information, wherein said central processor comprises:

(a) a memory for storing service plan basic information, passage information, actual running time in said specific section, standard running time, and actual service interval; and (b) a processing unit which:

(1) adds a passage time of a bus under forecast at the arrival at a latest ground radio unit to a sum of expected running time for divided unit segments of route where the bus has not yet run, (2) sets a finite time frame for providing the running time of buses which have run in the past, (3) calculates an average movement value of a plurality of buses which have passed in said specific section before the bus under forecast by using a delay coefficient normalized for the standard running time and a weight value for the actual running time, (4) determines a sample value showing an average movement value of each specific section for the bus under forecast from the calculated average movement value, (5) calculates an expected running time in each specific section by multiplying said sample value by said standard running time, and (6) calculates arrival time at a specific location by cumulating expected running time of each specific section in a portion of route where the bus has not yet run through a similar computational process; and (c) wherein arrival time at a specific location and information of route bus operation calculated by said processing unit is displayed on display units provided in each location of the bus route and on each route bus.

2. A system according to claim 1, wherein said central processor comprises a processing unit which calculates a bus service interval at a certain time interval, based on an actual number of buses which have passed in a certain time length in the past in front of a road unit incorporating the ground radio unit installed at each location of the bus route and an expected number of buses which will pass in a certain time length in the future, from a sum of the actual number of buses and the expected number of buses and from a sum of each certain time length, and wherein an approach guidance display unit for displaying the result of calculation is incorporated in said road unit.

3. A system according to claim 1, wherein said central processor comprises a processing unit which:

(a) sets the time frame of running time in the past (actual value), (b) calculates average movement values li (will be termed sample values; i=0, −1, −2, . . . ) of buses which have passed a specific section of route before the bus under forecast by using a delay coefficient D normalized for a standard running time and a weight value W for the actual running time as:

$$l_0=W_0D_0+(1-W_0)l_{-1}$$

$$l_{-1}=W_1D_{-1}+(1-W_{-1})l_2(i=0,\ -1,\ -2,\ \ldots)$$

(where suffix 0, −1 and −2 signify values for the previous bus, preceding bus and more preceding bus), (c) confines the entry time S of the bus under forecast and buses which have run into a unit segment of the route, (d) sets the time frame of forecast, calculates a sample value $l_1$ of the bus under forecast in the specific section from the calculated sample values $l_0$ and $l_{-1}$ as:

$$l_1 = l_0 + K\cdot\frac{l_0 - l_{-1}}{s_0 - s_{-1}}\cdot(s_1 - s_0)$$

(where suffixes 1, 0 and −1 signify values for the bus under forecast, the previous bus and the further preceding bus), (e) calculates an expected running time in the specific section by multiplying the sample value $l_1$ and standard running time $T_s$, and (f) calculates the arrival time at a specific location by cumulating running time of each specific section in a portion of route where the bus has not yet run.

4. A system according to claim 1, wherein said central processor comprises a processing unit which:

(a) sets the time frame of running time in the past (actual value), (b) calculates average movement values li (will be termed sample values; i=0, −1, −2, . . . ) of buses which have passed the specific section of route before the bus under forecast by using a delay coefficient D normalized for a standard running time and a weight value W for the actual running time as:

$$l_0=W_0D_0+(1-W_0)\ l_{-1}$$

$$l_1=W_1D_{-1}+(1-W_{-1})l_{-2}$$

where suffixes 0, −1 and −2 signify values for the previous bus, preceding bus and more preceding bus), (c) confines the entry time S of the bus under forecast and buses which have run into the unit segment of route, limits the time frame of forecast, calculates a sample value $l_1$ of the bus under forecast in the specific section from the calculated sample value $l_0$ and $l_{-1}$ as:

$$l_1 = l_0 + K\cdot\frac{l_0 - l_{-1}}{s_0 - s_{-1}}\cdot(s_1 - s_0)$$

(where suffix 1, 0 and −1 signify values for the bus under forecast, the previous bus and the further preceding bus), (d) calculates an expected running time in the specific section by multiplying the sample value $l_1$ and standard running time $T_s$, (e) calculates the arrival time at a specific location by cumulating running time of each specific section in a portion of route where the bus does not yet run; and wherein said display unit is provided in a road unit on the bus route incorporating said ground radio unit so as to constitute an approach guidance unit for displaying the arrival time or departure time of the route bus.

5. A system according to claim 1, wherein said display means is provided in a road unit on the bus route incorporating said ground radio unit so as to constitute an approach guidance display unit for displaying the arrival time or departure time of the route bus.

6. A system according to claim 1, wherein said central processor comprises a processing unit which:

(a) sets the time frame of running time in the past (actual value), (b) calculates average movement values li (will be termed sample values; i=0, −1, −2, . . . ) of buses which have passed the specific section of route before the bus under forecast by using a delay coefficient D normalized for a standard running time and a weight value W for the actual running time as:

$$l_0=W_0D_0+(1-W_0)l_{-1}$$

$$l_{-1}=W_1D_{-1}+(1-W_{-1})l_{-2}$$

where suffixes 0, −1 and −2 signify values for the previous bus, preceding bus and more preceding bus), (c) confines the entry time S of the bus under forecast and buses which have run into the unit segment of route, (d) sets the time frame of forecast, calculates a sample value $l_1$ of the bus under forecast in the specific section from the calculated sample values $l_0$ and $l_{-1}$ as:

$$l_1 = l_0 + K\cdot\frac{l_0 - l_{-1}}{s_0 - s_{-1}}\cdot(s_1 - s_0)$$

where suffix 1, 0 and −1 signify values for the bus under forecast, the previous bus and the further preceding bus, (e) calculates an expected running time in the specified section by multiplying the sample value $l_1$ and standard running time $T_s$, and calculates the arrival time at a specific location by cumulating running time of each specified section in a portion of route where the bus has not yet run; and wherein a road unit is installed at each of an expected arrival location in the vicinity of a bus terminal, a final arrival location immediately before the bus terminal, an incoming instruction information reception location and a bus stop in the bus terminal, said central processor operating to:

(f) estimate the arrival time of a bus at the bus terminal when the bus has arrived at the expected arrival location, (g) produce a service time table for the next cycle of service (from the bus terminal to a turning point and back to the terminal), (h) fix the service time table for one cycle of service when the bus has arrived at the final arrival location immediately before the bus terminal based on the actual running time experienced in this service, (i) produce service instruction information (incoming instruction information for moving the bus to the bus stop in the terminal in the next service, service time table and other information), (j) transmit the incoming instruction information to a road post at a reception location for the information and other information to a road post at the bus stop in the terminal, and (k) display the service instruction information on the service instruction unit on the vehicle through communication with the road unit during the entry of the bus to the terminal.

* * * * *

UNITED STATES PATENT AND TRADEMARK OFFICE
CERTIFICATE OF CORRECTION

PATENT NO. : 4,799,162
DATED : January 17, 1989
INVENTOR(S) : Kiyoshi Shinkawa et al.

It is certified that error appears in the above-identified patent and that said Letters Patent is hereby corrected as shown below:

Column 1, line 38, delete "automobiles";
line 47, "6jb" should be --6b--.
Column 3, line 62, after "time" insert --point--.
Column 8, line 57, "k" should be --K--;
line 62, "k" should be --K--.
Column 10, line 47, after "43p-43s" insert --are--.
Column 11, line 20, after "arrival" delete the comma ",";
line 21, after "buses" delete "/".

Signed and Sealed this

Sixth Day of February, 1990

*Attest:*

JEFFREY M. SAMUELS

*Attesting Officer* — *Acting Commissioner of Patents and Trademarks*